125,120

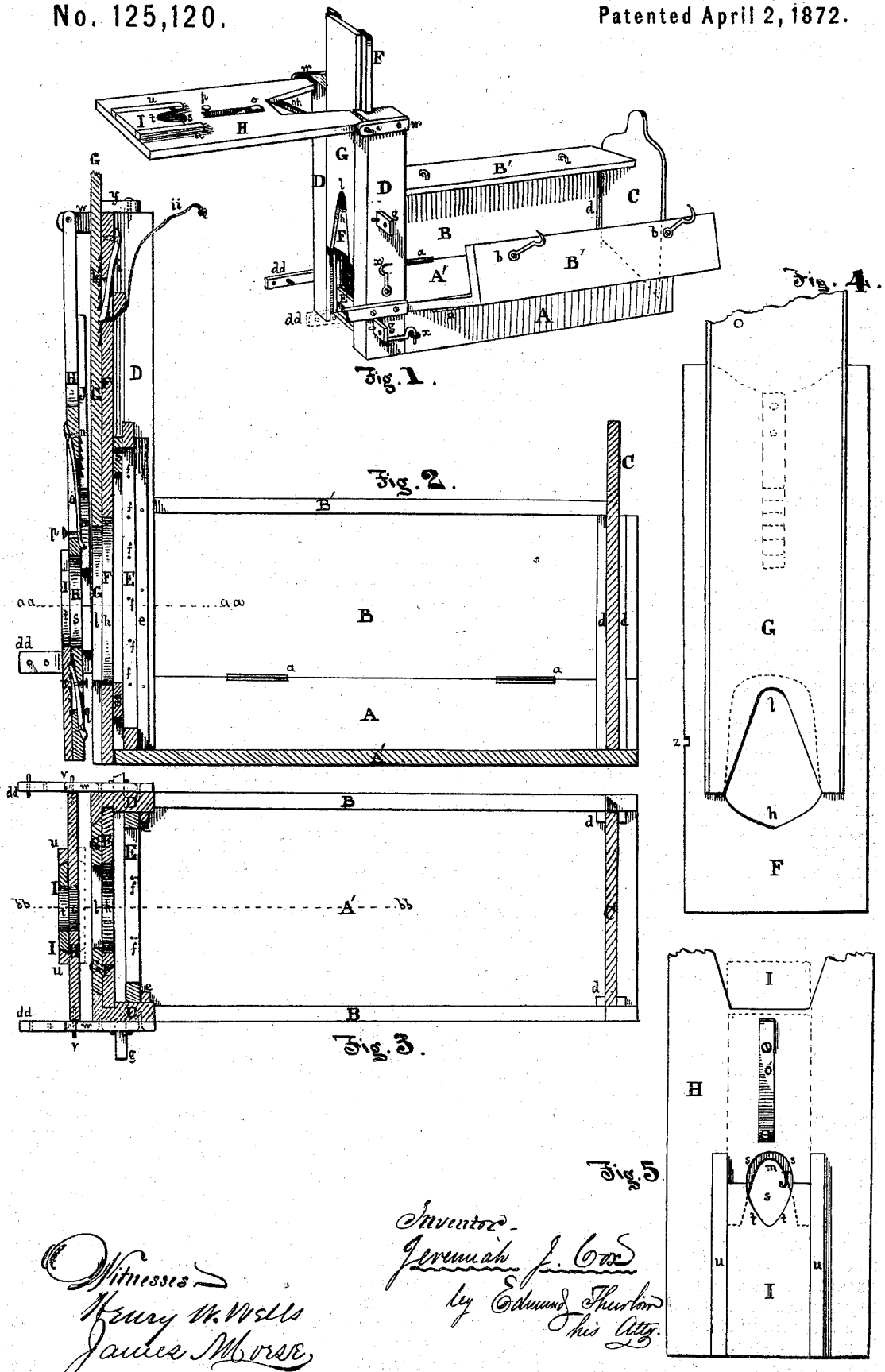

UNITED STATES PATENT OFFICE.

JEREMIAH J. COX, OF WOODHULL, ILLINOIS.

IMPROVEMENT IN HOG-TRAPS.

Specification forming part of Letters Patent No. 125,120, dated April 2, 1872.

*To all whom it may concern:*

Be it known that I, JEREMIAH J. COX, of Woodhull, in the county of Henry and in the State of Illinois, have invented an Improvement in Hog-Traps; and do hereby declare that the following is a full, clear, and exact description thereof, reference being had to the annexed drawing making a part of this specification, in which like letters of reference refer to like parts, and in which—

Figure 1 represents a perspective view; Fig. 2, a vertical longitudinal section, (through line $b\ b\ b\ b$, Fig. 3;) Fig. 3, horizontal section through $a\ a\ a\ a$, Fig. 2; Fig. 4, front view of interior sliding boards F G, which clasp the hog's neck; Fig. 5, front view of the swinging boards which hold the "snout." Scale of drawing, one inch to one foot.

First, this invention relates to an improvement in hog-traps, by which the trap is left open through and through, so that the animal, seeing the light of day through it, will readily enter it, the trap being merely closed at the exit-end by a wire screen; second, in inserting beyond this screen a vertically-sliding board having a hole to receive the animal's neck, with an attached forked slide to span the neck behind the ears; third, in providing a board with an aperture carrying a forked slide on either side of it to adapt the opening in the board to the size of and to hold the animal's snout; this board is pivoted at the top of the trap, and is brought over the snout when the head is secured; fourth, in making the trap open on either side and from the center, so as to perform all necessary operations on the animal and on either side of him while thus held.

A′ A represent the bottom and sides of the trap, which is an oblong box, with boards A about one foot high on either side of the bottom A′, to the upper edge of each of which is hinged the upper parts of the box B′ B′, which close down the middle of the box, and are held together by the hooks $b\ b$ (and eyes) on the top. C is a hatch at the entrance of the box, sliding in cleats $d\ d$. D D are "uprights" forming the exterior front angles of the box, each containing recesses or slots, in which the boards E F G slide, and may be permanently fixed to the box, or be attached to the same by means of the hooks $x$ or other fastening. Two horizontal bars, $g\ g$, running through mortises in the posts, unite the latter, and have holes fitted with adjustable pins to confine them. To the upper end of the posts, and in the attached pieces $w\ w$, are pivoted the swinging snout-board H, and to the lower part of said posts are fastened similar pieces, $d\ d$, which carry adjusting-pins to hold the snout-board H against the hog's snout. E, a vertical screen or square frame, with cross-rods $f\ f$, &c., or "grating," which slides in a slot or recess between the posts D D, the cleats $e\ e$, and the bars $g\ g$. F G are strong vertical boards, F being an interior and G an exterior board, both sliding in recesses in posts D D, and form the front of the box. F is pierced with a hole, $h$, large enough to admit the hog's head. The upper part of this board has a spring, with an attached string, $i\ i$, for retaining the board G against and with F at any required height. The board G is made with a forked end, $l$, for modifying the size of the hole $h$ of board F. A movable pin on the upper part of these two boards unites them when necessary to raise them simultaneously, and a notch, $z$, on the side of F, for retaining the stop $y$, holds them elevated to let the hog out. H is a third board, (of similar size as F and G,) pivoted to the pieces $w\ w$ on top of the posts D D, and hanging therefrom at a little distance from and parallel with the boards F and G. It is pierced with a snout-hole, $s$, in its lower end and opposite or in front of the neck-hole $h$. Said hole $s$ is increased or lessened by means of sliding hatches I J running in cleats, one hatch on either side of the hole, and each having a curved notch, $t\ m$. (See Fig. 5.) The hatch J slides downward with its notch, and is retained by the small notches therein facing the board H, whose retaining catch or spring $o'$ is set in a recess in the board, and is disengaged by pulling the pin $p$. The hatch I is the same in form, but slides upward toward said hole $s$.

The operation of this trap is as follows: For slitting or ringing noses, the sides B′ B′ being securely fastened together by hooks $b\ b$, and the hatch C removed, the screen E is inserted as a temporary check against the escape of the hog; and as it transmits daylight, this end of the trap being pointed toward the light, the animal will readily enter by the passage at the hatch C. When he is in, the hatch is closed, and the boards F G are raised and their uniting-pin in their upper part removed, and the board F shut down to the floor of the trap. The screen E is now pulled out, and the hog thrusts his head through the neck-board F—i. e., through the hole $h$; now the board G, having the forked end $l$, is forced down behind his ears or head, the rising of the board being prevented by the spring $i$ and notches $k$ between the boards. The hog being now firmly held behind his head, the snout-board H is brought down from its horizontal to a vertical position, with the snout-hole $s$ onto the animal's snout as far as it can be pressed, at the same time adjusting the slides I J on either side of the hole $s$ to the size of the snout. The board H is now secured in this position by inserting a pin behind or on either side of it into the arms $d\ d$ on the posts D D. The hog is now held by his head by constriction of the boards F G and H I J behind his ears and about his snout, and now can be ringed or slit without any movement of his, or even squeaking. To perform other operations on hogs, &c., the animal, while thus held, can be readily got at by unhooking the sides B' B', or either of them, and opening the box, so as to approach him at either flank; or the box may be thrown over on either side, the side resting on the ground, to facilitate operations usually performed on these animals, as spaying, &c. After the operation the box is set on its bottom again, the animal being still within; the snout-board H is thrown up to its prop $h\ h$, the neck-boards F and G are raised, (first releasing G from the top of the animal's neck by pulling the string $i\ i$, which disengages the retaining-spring $i$ from the notches $k$ in the board G,) and they are retained on high by the stop $y$ in the notch $z$ in the board F, and the animal can escape.

What I claim as my invention is—

1. The box A A', when constructed with the half sides and tops B' B' hinged thereto, and united with hooks $b\ b$ or other fastenings, in combination with the posts D D and the hatch C, substantially as and for the purposes described.

2. In combination with the posts D D, the wired screen E, the neck-board F with its adjustable slide G, with its forked end $l$ to fit an animal's neck, substantially as and for the purposes described.

3. The swinging snout-board H, with hole $s$ and adjustable slides I J on either side, in combination with the arms $d\ d$ and their adjusting-pins, and the posts D D with their included boards F G, all working together as and for the purposes described.

In testimony that I claim the foregoing improvement in hog-traps, I have hereunto set my hand this 30th day of September, A. D. 1871.

JEREMIAH J. COX.

Witnesses:
GEORGE R. HALL,
HIRAM H. HALL.